(12) United States Patent
Fukai et al.

(10) Patent No.: US 11,767,039 B2
(45) Date of Patent: Sep. 26, 2023

(54) HYBRID VEHICLE

(71) Applicant: TOYOTA JIDOSHA KABUSHIKI KAISHA, Aichi-ken (JP)

(72) Inventors: Akiyoshi Fukai, Toyota (JP); Takahiro Andoh, Toyota (JP); Tetsuro Shibata, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 110 days.

(21) Appl. No.: 17/589,701

(22) Filed: Jan. 31, 2022

(65) Prior Publication Data

US 2022/0242454 A1     Aug. 4, 2022

(30) Foreign Application Priority Data

Feb. 3, 2021   (JP) .................................. 2021-015483

(51) Int. Cl.
*B60W 60/00*       (2020.01)
*B60W 20/40*       (2016.01)
*B60W 40/13*       (2012.01)
*B60W 40/09*       (2012.01)

(52) U.S. Cl.
CPC ........ *B60W 60/0053* (2020.02); *B60W 20/40* (2013.01); *B60W 40/09* (2013.01); *B60W 40/13* (2013.01); *B60W 2510/081* (2013.01); *B60W 2510/10* (2013.01)

(58) Field of Classification Search
CPC .. B60W 60/0053; B60W 20/40; B60W 40/09; B60W 40/13; B60W 2510/081; B60W 2510/10
See application file for complete search history.

(56) References Cited

U.S. PATENT DOCUMENTS

| | | | | |
|---|---|---|---|---|
| 7,055,636 | B2* | 6/2006 | Komiyama | B60K 6/442 180/65.23 |
| 9,827,989 | B1* | 11/2017 | Saxman | B60W 30/18 |
| 10,343,675 | B2* | 7/2019 | Hata | B60W 10/08 |
| 10,464,576 | B2* | 11/2019 | Sato | B60K 6/48 |
| 11,161,403 | B2* | 11/2021 | Lo | B60L 50/15 |
| 11,292,474 | B2* | 4/2022 | Nambu | B60W 30/20 |
| 2002/0062183 | A1* | 5/2002 | Yamaguchi | B60K 6/543 903/905 |
| 2004/0251065 | A1* | 12/2004 | Komiyama | B60K 6/365 903/910 |

(Continued)

FOREIGN PATENT DOCUMENTS

| | | |
|---|---|---|
| JP | 201830510 A | 3/2018 |
| JP | 201852376 A | 4/2018 |
| JP | 2019214309 A | 12/2019 |

*Primary Examiner* — Ramsey Refai
(74) *Attorney, Agent, or Firm* — HAUPTMAN HAM, LLP

(57) ABSTRACT

A hybrid vehicle includes an engine, a motor, and a controller. The controller is configured to control the engine and the motor. The controller is configured to, when the engine is operated under load at the time when the vehicle slows down and stops in an autonomous driving mode in which the vehicle runs without driver's operation, set a controlling lower limit rotation speed of the engine to a maximum rotation speed out of a plurality of candidate rotation speeds and control the engine such that the engine is operated under load within a range higher than or equal to the controlling lower limit rotation speed.

4 Claims, 4 Drawing Sheets

(56) References Cited

U.S. PATENT DOCUMENTS

| | | | |
|---|---|---|---|
| 2015/0321659 A1* | 11/2015 | Sato | B60W 20/17 |
| | | | 903/905 |
| 2016/0328976 A1* | 11/2016 | Jo | F02D 29/02 |
| 2018/0056978 A1 | 3/2018 | Hata et al. | |
| 2018/0086331 A1 | 3/2018 | Sato et al. | |
| 2019/0135127 A1* | 5/2019 | Ooi | B60L 58/24 |
| 2019/0210587 A1* | 7/2019 | Nishida | B60W 10/08 |
| 2019/0381994 A1 | 12/2019 | Nambu et al. | |
| 2022/0371575 A1* | 11/2022 | Volmerding | F02D 41/024 |

* cited by examiner

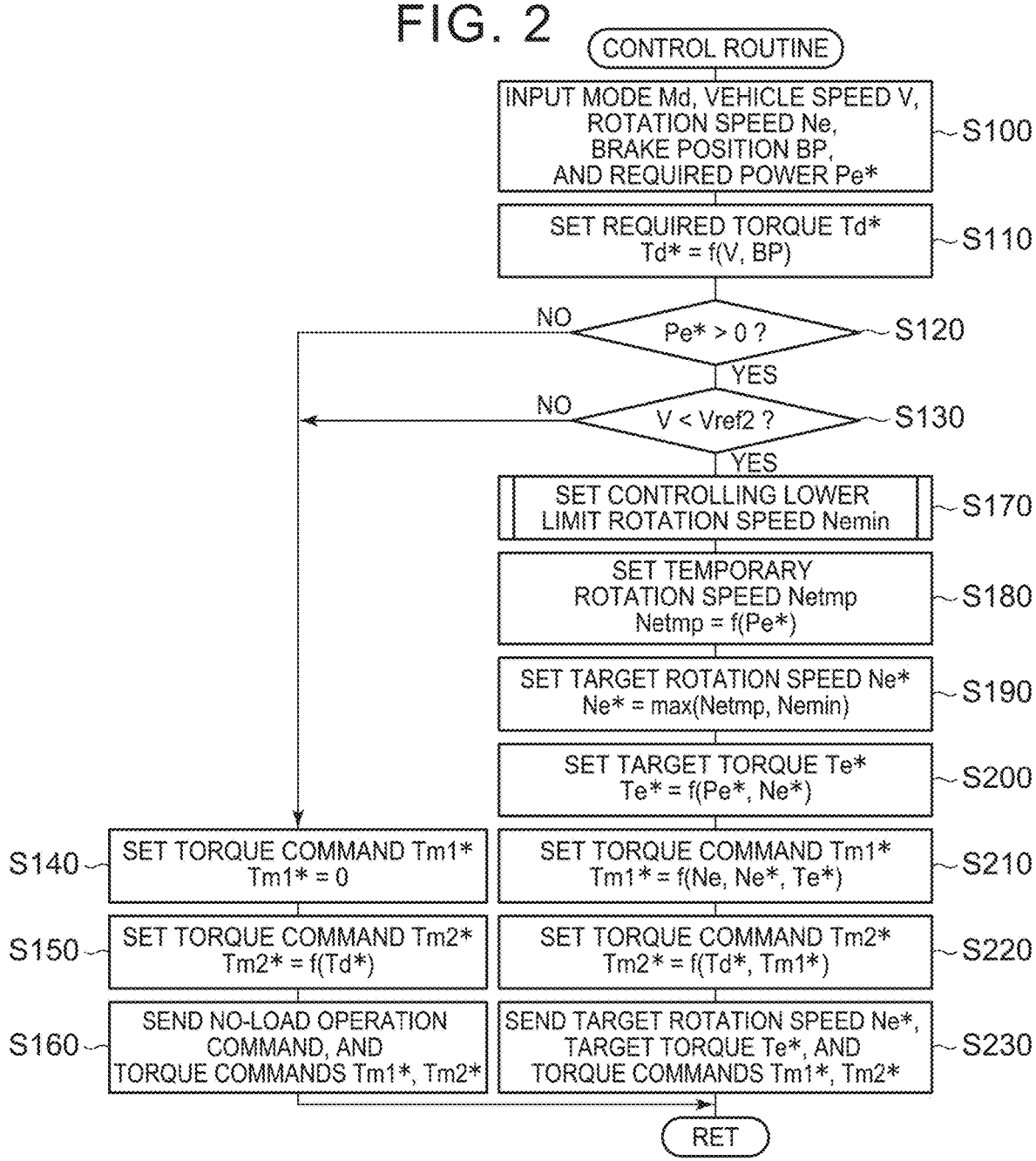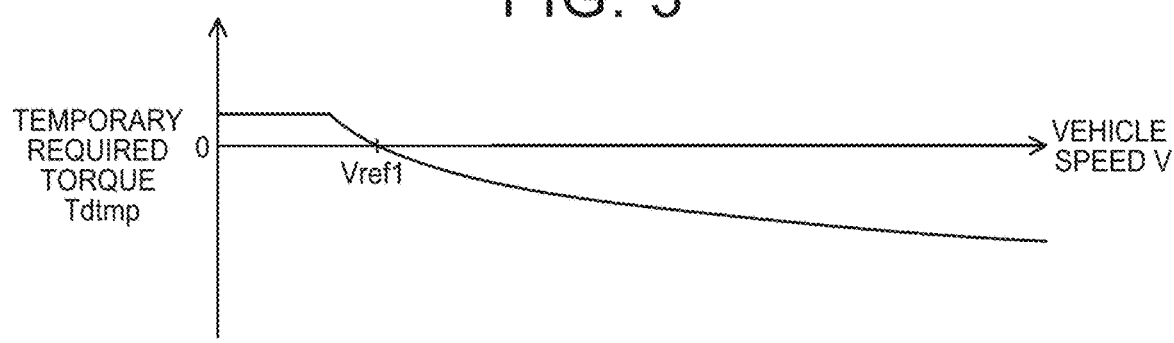

HYBRID VEHICLE

CROSS-REFERENCE TO RELATED APPLICATION

This application claims priority to Japanese Patent Application No. 2021-015483 filed on Feb. 3, 2021, incorporated herein by reference in its entirety.

BACKGROUND

1. Technical Field

The present disclosure relates to a hybrid vehicle.

2. Description of Related Art

Hitherto, there has been suggested a hybrid vehicle that includes an engine, a generator coupled to the engine via a gear mechanism, a drive motor, and an electrical storage device connected to the generator and the motor via power lines and configured to set a target power generation amount of the generator based on vehicle information, set the rotation speed of the engine and the load torque of the generator based on the target power generation amount of the generator, and control the engine and the generator (see, for example, Japanese Unexamined Patent Application Publication No. 2019-214309 (JP 2019-214309 A)). When a rattle noise reduction control for the gear mechanism is satisfied, the hybrid vehicle mixes a rattle noise with an engine noise by increasing the rotation speed of the engine as compared to when the condition is not satisfied.

SUMMARY

In the thus configured hybrid vehicle, when the engine is operated under load at the time when the vehicle slows down and stops in an autonomous driving mode in which the vehicle runs without driver's operation, if a controlling lower limit rotation speed of the engine changes a number of times, the rotation speed of the engine changes a number of times, with the result that the driver may feel uncomfortable.

The disclosure provides a hybrid vehicle directed to reducing an uncomfortable feeling of a driver when the vehicle slows down and stops in an autonomous driving mode.

Some aspects of the hybrid vehicle of the disclosure are configured as follows.

An aspect of the disclosure relates to a hybrid vehicle. The hybrid vehicle includes an engine, a motor, and a controller. The controller is configured to control the engine and the motor. The controller is configured to, when the engine is operated under load at the time when the vehicle slows down and stops in an autonomous driving mode in which the vehicle runs without driver's operation, set a controlling lower limit rotation speed of the engine to a maximum rotation speed out of a plurality of candidate rotation speeds and control the engine such that the engine is operated under load within a range higher than or equal to the controlling lower limit rotation speed.

With the hybrid vehicle according to the aspect of the disclosure, when the engine is operated under load at the time when the vehicle slows down and stops in an autonomous driving mode in which the vehicle runs without driver's operation, the controlling lower limit rotation speed of the engine is set to a maximum rotation speed of the plurality of candidate rotation speeds, and the engine is controlled such that the engine is operated under load within a range higher than or equal to the controlling lower limit rotation speed. Thus, when the engine is operated under load at the time when the vehicle slows down and stops in the autonomous driving mode, switching of the controlling lower limit rotation speed of the engine is suppressed, and a change in the rotation speed of the engine is suppressed. As a result, an uncomfortable feeling of the driver is reduced.

In the hybrid vehicle according to the aspect of the disclosure, the motor may be coupled to a drive wheel via a mechanical coupling portion, and the plurality of candidate rotation speeds may include a first rotation speed used to reduce a muffled sound of the engine and a second rotation speed higher than the first rotation speed and used to reduce a rattle noise at the mechanical coupling portion.

In the hybrid vehicle according to the aspect of the disclosure, the controller may be configured to, when the engine is operated under load at the time when the vehicle slows down and stops in a normal driving mode in which the vehicle runs with driver's operation, set the controlling lower limit rotation speed to a rotation speed selected from among the plurality of candidate rotation speeds based on a brake operation amount and control the engine such that the engine is operated under load within a range higher than or equal to the controlling lower limit rotation speed. With this configuration, when the engine is operated under load at the time when the vehicle slows down and stops in the normal driving mode, the controlling lower limit rotation speed is able to be changed as needed.

In this case, the hybrid vehicle may further include a second motor, and a planetary gear including three rotating elements respectively connected to the second motor, the engine, and a drive shaft coupled to a drive wheel so as to be arranged in a stated order in a nomograph, the motor may be coupled to the drive wheel via a mechanical coupling portion, the plurality of candidate rotation speeds may include a first rotation speed used to reduce a muffled sound of the engine and a second rotation speed higher than the first rotation speed and used to reduce a rattle noise at the mechanical coupling portion, and the controller may be configured to, when the engine is operated under load at the time when the vehicle slows down and stops in the normal driving mode, and when the controller determines that a rattle noise condition related to a rattle noise at the mechanical coupling portion is not satisfied based on the brake operation amount, set the controlling lower limit rotation speed to the first rotation speed, and, when the controller determines that the rattle noise condition is satisfied, set the controlling lower limit rotation speed to the second rotation speed, and, when the engine is operated under load at the time when the vehicle slows down and stops in the autonomous driving mode, set the controlling lower limit rotation speed to the second rotation speed. With the above hardware configuration, when the rotation speed of the engine is the second rotation speed, as compared to when the rotation speed of the engine is the first rotation speed, forward movement torque output to the drive shaft via the planetary gear due to the load operation of the engine and the drive of the second motor reduces, and forward movement torque output from the motor to the drive shaft increases. Thus, when the engine is operated under load at the time when the vehicle slows down and stops in the normal driving mode, a rattle noise at the mechanical coupling portion is reduced by setting the controlling lower limit rotation speed of the engine based on whether the rattle noise condition is satisfied. When the engine is operated under load at the time when the vehicle slows down and stops in the autonomous driving mode, switching of the controlling lower limit rotation speed of the engine based on whether the rattle noise condition is satisfied is suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flowchart showing an example of a control routine;

FIG. 3 is a view illustrating an example of a temporary required torque map;

DETAILED DESCRIPTION OF EMBODIMENTS

An embodiment of the disclosure will be described.

Figure 1:
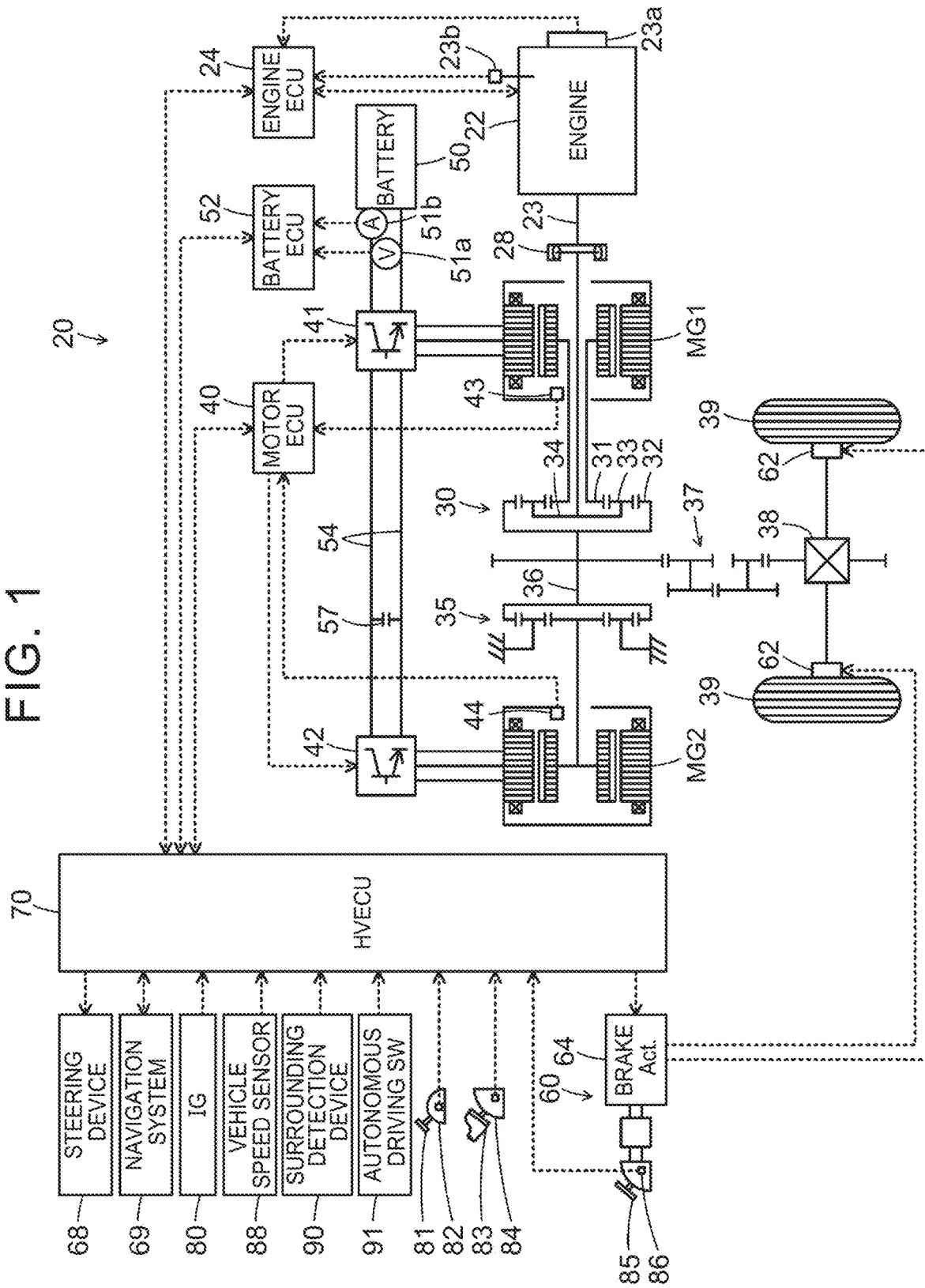
FIG. 1 is a configuration diagram schematically showing the configuration of a hybrid vehicle according to an embodiment of the disclosure.

FIG. 1 is a configuration diagram schematically showing the configuration of a hybrid vehicle 20 according to the embodiment of the disclosure. As shown in the drawing, the hybrid vehicle 20 of the embodiment includes an engine 22, a planetary gear 30, motors MG1, MG2, inverters 41, 42, a battery 50 serving as an electrical storage device, a hydraulic brake device 60 serving as a braking force application device, a steering device 68, a navigation system 69, a surrounding detection device 90, and a hybrid electronic control unit (hereinafter, referred to as HVECU) 70.

The engine 22 is an internal combustion engine that outputs power by using gasoline, light oil, or the like as a fuel. A crankshaft 23 of the engine 22 is connected to the planetary gear 30 via a damper 28. The operation of the engine 22 is controlled by an engine electronic control unit (hereinafter, referred to as engine ECU) 24.

Although not shown in the drawing, the engine ECU 24 includes a microcomputer including a CPU, a ROM, a RAM, a flash memory, input and output ports, and a communication port. Signals required to control the operation of the engine 22 are input from various sensors to the engine ECU 24 via the input port. Examples of the signals that are input to the engine ECU 24 include a crank angle θcr from a crank position sensor 23a, and a coolant temperature Tw from a coolant temperature sensor 142. The crank position sensor 23a detects the rotation position of the crankshaft 23 of the engine 22. The coolant temperature sensor 142 detects the temperature of coolant of the engine 22. Various control signals for controlling the operation of the engine 22 are output from the engine ECU 24 via the output port. The engine ECU 24 is connected to the HVECU 70 via the communication port. The engine ECU 24 computes the rotation speed Ne of the engine 22 based on the crank angle θcr from the crank position sensor 23a.

The planetary gear 30 is configured as a single pinion-type planetary gear train. The planetary gear 30 includes a sun gear 31 that is an external gear, a ring gear 32 that is an internal gear, a plurality of pinion gears 33 that are in mesh with the sun gear 31 and the ring gear 32, and a carrier 34 that supports the pinion gears 33 such that the pinion gears 33 are rotatable and revolvable. The rotor of the motor MG1 is connected to the sun gear 31. A drive shaft 36 coupled to drive wheels 39 via a differential gear 38 and a gear mechanism 37 is connected to the ring gear 32. A motor MG2 is connected to the drive shaft 36 via a reduction gear 35. The crankshaft 23 of the engine 22 is connected to the carrier 34 via the damper 28.

The motor MG1 is configured as a synchronous generator-motor. As described above, the rotor of the motor MG1 is connected to the sun gear 31 of the planetary gear 30. The motor MG2 is configured as a synchronous generator-motor as in the case of the motor MG1. As described above, the rotor of the motor MG2 is connected to the drive shaft 36 via the reduction gear 35. The inverters 41, 42 are used to drive the motors MG1, MG2, respectively. The inverters 41, 42 each are connected to the battery 50 via power lines 54. A smoothing capacitor 57 is connected to the power lines 54. Each of the motors MG1, MG2 is driven for rotation by a motor electronic control unit (hereinafter, referred to as motor ECU) 40 executing switching control over a plurality of switching elements (not shown) of an associated one of the inverters 41, 42.

Although not shown in the drawing, the motor ECU 40 includes a microcomputer including a CPU, a ROM, a RAM, a flash memory, input and output ports, and a communication port. Signals required to control the drive of the motors MG1, MG2 are input from various sensors to the motor ECU 40 via the input port. Examples of signals that are input to the motor ECU 40 include rotation positions θm1, θm2 of the rotors of the motors MG1, MG2 from rotation position detection sensors 43, 44, and phase currents Iu1, Iv1, Iu2, Iv2 from current sensors (not shown). The rotation position detection sensors 43, 44 respectively detect the rotation positions of the rotors of the motors MG1, MG2. The current sensors respectively detect the phase currents that flow through the phases of the motors MG1, MG2. Switching control signals and the like are output from the motor ECU 40 to the switching elements (not shown) of the inverters 41, 42 via the output port. The motor ECU 40 is connected to the HVECU 70 via the communication port. The motor ECU 40 computes the rotation speed Nm1 of the motor MG1 based on the rotation position θm1 of the rotor of the motor MG1 from the rotation position detection sensor 43. Similarly, the motor ECU 40 computes the rotation speed Nm2 of the motor MG2 based on the rotation position θm2 of the rotor of the motor MG2 from the rotation position detection sensor 44.

The battery 50 is, for example, a lithium ion secondary battery or a nickel-metal hydride secondary battery and, as described above, connected to the inverters 41, 42 via the power lines 54. The battery 50 is managed by a battery electronic control unit (hereinafter, referred to as battery ECU) 52.

Although not shown in the drawing, the battery ECU 52 includes a microcomputer including a CPU, a ROM, a RAM, a flash memory, input and output ports, and a communication port. Signals required to manage the battery 50 are input from various sensors to the battery ECU 52 via the input port. Examples of the signals that are input to the battery ECU 52 include the voltage Vb of the battery 50 from a voltage sensor 51a, and the current Ib of the battery 50 from a current sensor 51b. The voltage sensor 51a is connected between the terminals of the battery 50. The current sensor 51b is connected to the output terminal of the battery 50. The battery ECU 52 is connected to the HVECU 70 via the communication port. The battery ECU 52 computes a state of charge SOC based on an accumulated value of the current Ib of the battery 50 from the current sensor 51b. A state of charge SOC is the percentage of the capacity of dischargeable electric power from the battery 50 to the total capacity of the battery 50.

The hydraulic brake device 60 includes a plurality of brake pads 62 respectively attached to the drive wheels 39 and driven wheels (not shown), and a brake actuator 64. The brake actuator 64 is configured as an actuator for applying a braking force to the drive wheels 39 and the driven wheels by adjusting the hydraulic pressures of a plurality of brake wheel cylinders (not shown) that respectively drive the brake pads 62. The brake actuator 64 is controlled by the HVECU 70.

The steering device 68 steers front wheels out of the drive wheels 39 and the driven wheels based on driver's steering operation in a normal driving mode and steers the front wheels based on a control signal from the HVECU 70 in an autonomous driving mode. Here, the normal driving mode is a mode in which the vehicle runs in accordance with driver's operation, and the autonomous driving mode is a mode in which the vehicle runs without driver's operation.

Although not shown in the drawing, the navigation system 69 includes a system body, a GPS antenna, and a display. Although not shown in the drawing, the system body includes a CPU, a ROM, a RAM, a storage medium (for example, an HDD, an SSD, or the like), input and output ports, and a communication port. Map information or the like is stored in the storage medium of the system body. The map information includes service information (for example, sightseeing information, parking place information, and the like), road information on travel sections (for example, sections between traffic lights, sections between intersections, and the like) and other information. The road information includes distance information, width information, lane count information, regional information (an urban area or a suburban area), category information (an ordinary road or an expressway), gradient information, legal speed information, traffic light information, and the like. The GPS antenna receives information on the current location of the host vehicle. The display is configured as a touch panel-type display that is capable of displaying various pieces of information and that allows the driver to input various instructions. The various instructions include information on the current location of the host vehicle, information on a scheduled travel route from the current location of the host vehicle to a destination, and the like. The main unit of the navigation system 69 is connected to the HVECU 70 via the communication port.

In the navigation system 69, when a destination is set by the driver operating the display, the system body sets a scheduled travel route from the current location of the host vehicle to the destination based on the set destination, the map information stored in the storage medium of the system body, and the current location of the host vehicle from the GPS antenna and displays the set scheduled travel route on the display for route guidance.

The surrounding detection device 90 is configured as a device for detecting host vehicle surroundings information. The surrounding detection device 90 includes a camera, a millimeter-wave radar, a submillimeter-wave radar, an infrared laser radar, a sonar, or the like. Examples of the host vehicle surroundings information include distances to another vehicle on the front, rear, and side to the host vehicle.

Although not shown in the drawing, the HVECU 70 includes a microcomputer including a CPU, a ROM, a RAM, a flash memory, input and output ports, and a communication port. Signals from various sensors are input to the HVECU 70 via the input port. Examples of the signals that are input to the HVECU 70 include an ignition signal from an ignition switch 80 and a shift position SP from a shift position sensor 82. The shift position sensor 82 detects the operating position of a shift lever 81. Examples of signals that are input to the HVECU 70 also include an accelerator position AP from an accelerator pedal position sensor 84, a brake position BP from a brake pedal position sensor 86, and a vehicle speed V from a vehicle speed sensor 88. The accelerator pedal position sensor 84 detects the depression amount of an accelerator pedal 83. The brake pedal position sensor 86 detects the depression amount of a brake pedal 85. Examples of signals that are input to the HVECU 70 may also include host vehicle surroundings information from the surrounding detection device 90, and a switch signal from an autonomous driving switch 91 for providing an instruction to switch between the normal driving mode and the autonomous driving mode. Various control signals are output from the HVECU 70 via the output port. Examples of the signals output from the HVECU 70 may include a control signal to the steering device 68 in the autonomous driving mode and a control signal to the brake actuator 64 of the hydraulic brake device 60. As described above, the HVECU 70 is connected to the engine ECU 24, the motor ECU 40, the battery ECU 52, the brake ECU 66, and the navigation system 69 via the communication port.

In the hybrid vehicle 20 of the thus configured embodiment, the HVECU 70, the engine ECU 24, and the motor ECU 40 cooperatively control the engine 22, the motors MG1, MG2, and the hydraulic brake device 60 such that the hybrid vehicle 20 runs in a hybrid drive mode (HV drive mode) or runs in an electric drive mode (EV drive mode) based on the accelerator position AP and the brake position BP in the normal driving mode (when the autonomous driving switch 91 is off) or in the autonomous driving mode (when the autonomous driving switch 91 is on). Here, the HV drive mode is a mode in which the hybrid vehicle 20 runs with the operation of the engine 22, and the EV drive mode is a mode in which the hybrid vehicle 20 runs without the operation of the engine 22. In the normal driving mode, values respectively detected by the accelerator pedal position sensor 84 and the brake pedal position sensor 86 are used as the accelerator position AP and the brake position BP. In the autonomous driving mode, values respectively set (simulated) based on information from the navigation system 69 (for example, map information, the current location of the host vehicle, a scheduled travel route, and the like), a vehicle speed V from the vehicle speed sensor 88, host vehicle surroundings information from the surrounding detection device 90, and the like are used as the accelerator position AP and the brake position BP. In the autonomous driving mode, the HVECU 70 controls the steering device 68 such that, for example, a lane is maintained or a lane is changed based on information from the navigation system 69, a vehicle speed V from the vehicle speed sensor 88, host vehicle surroundings information from the surrounding detection device 90, and the like.

Next, the operation of the hybrid vehicle 20 of the thus configured embodiment will be described. Particularly, control over the engine 22 and the motors MG1, MG2 at the time when the vehicle slows down and stops in the normal driving mode or the autonomous driving mode will be described. At this time, the hydraulic brake device 60 is controlled by the HVECU 70 such that a braking force based on the brake position BP acts on the drive wheels 39 and the driven wheels.

FIG. 2 is a flowchart that shows an example of a control routine that is executed by the HVECU 70. The routine is repeatedly executed when the accelerator is off in the normal driving mode or the autonomous driving mode. When the routine is executed, the HVECU 70 initially inputs data such as a driving mode Md, a vehicle speed V, a brake position BP, a rotation speed Ne of the engine 22, and a required power Pe* of the engine 22 (step S100).

Here, a driving mode (the normal driving mode or the autonomous driving mode) set based on a switch signal from the autonomous driving switch 91 is input as the driving mode Md. A value detected by the vehicle speed sensor 88 is input as the vehicle speed V. A value detected by the brake pedal position sensor 86 is input as the brake position BP in the normal driving mode. A value set based on information from the navigation system 69, a vehicle speed V from the vehicle speed sensor 88, host vehicle surroundings information from the surrounding detection device 90, and the like is input as the brake position BP in the autonomous driving mode.

A value computed by the engine ECU 24 is input through communication as the rotation speed Ne of the engine 22. A value set through a required power setting routine (not shown) that is executed by the HVECU 70 is input as the required power Pe* of the engine 22. In the required power setting routine, the HVECU 70 sets a value of zero for the required power Pe* when the load operation of the engine 22 is not required, and sets a positive value for the required power Pe* when the load operation of the engine 22 is required. Examples of the case where the load operation of the engine 22 is required include a case where the state of charge SOC of the battery 50 is lower than or equal to a threshold Sref (forcible charging of the battery 50 is needed) and a case where the coolant temperature Tw of the engine 22 is lower than or equal to a value Twref (warm-up of the engine 22 is needed). A constant value may be set as the required power Pe* when the load operation of the engine 22 is required or a value based on the state of charge SOC of the battery 50, the coolant temperature Tw of the engine 22, or the like may be set as the required power Pe* when the load operation of the engine 22 is required.

When data is input in this way, the HVECU 70 sets a required torque Td* required of the drive shaft 36 based on the vehicle speed V and the brake position BP (step S110). The process is, for example, executed such that a temporary torque Tdtmp as a temporary value of the required torque Td* is set by applying the vehicle speed V to a temporary required torque map, the temporary torque Tdtmp is set for the required torque Td* when the vehicle speed V is higher than or equal to a threshold Vref1, and a value obtained by multiplying the temporary torque Tdtmp by a correction coefficient kbp based on the brake position BP is set for the required torque Td* when the vehicle speed V is lower than the threshold Vref1. The temporary required torque map is set in advance as the relationship between vehicle speed V and temporary torque Tdtmp and is stored in the ROM or the flash memory of the HVECU 70. FIG. 3 is a view illustrating an example of the temporary required torque map. As shown in the drawing, a value less than or equal to a value of zero is set for the temporary torque Tdtmp when the vehicle speed V is higher than or equal to the threshold Vref1, and a positive value (so-called creep torque) is set for the temporary torque Tdtmp when the vehicle speed V is lower than the threshold Vref1. The threshold Vref1 is set as a boundary value as to whether to require creep torque to be output to the drive shaft 36, and, for example, a value of about 7 km/h to about 10 km/h is used as the threshold Vref1. A value of one is set for the correction coefficient kbp when the brake position BP is less than the threshold BPref, and a value greater than or equal to a value of zero and less than a value of one is set for the correction coefficient kbp when the brake position BP is greater than or equal to the threshold BPref, that is, for example, a value that gradually reduces from a value of one toward a value of zero is set for the correction coefficient kbp as the brake position BP increases. Thus, in the case where the vehicle speed V is lower than the threshold Vref1, when the brake position BP is greater than or equal to the threshold BPref, the required torque Td* (creep torque) required of the drive shaft 36 is reduced as compared to when the brake position BP is less than the threshold BPref.

Subsequently, the HVECU 70 checks whether the required power Pe* of the engine 22 is a value of zero or a positive value (step S120). When the required power Pe* of the engine 22 is a value of zero, the HVECU 70 determines that the load operation of the engine 22 is not required and sets a value of zero for a torque command Tm1* of the motor MG1 (step S140) and computes a torque command Tm2* of the motor MG2 through the expression (1) by using the required torque Td* and a gear ratio Gr of the reduction gear 35 (step S150). Here, the expression (1) is an expression for setting the torque command Tm2* of the motor MG2 such that the required torque Td* is output to the drive shaft 36.

$$Tm2^* = Td^*/Gr \quad (1)$$

The HVECU 70 sends a no-load operation command for the engine 22 to the engine ECU 24 and sends the torque commands Tm1*, Tm2* for the motors MG1, MG2 to the motor ECU 40 (step S160), and ends the routine. When the engine ECU 24 receives the no-load operation command for the engine 22, the engine ECU 24 executes operation control (intake air volume control, fuel injection control, ignition control, and the like) over the engine 22 such that the engine 22 is operated under no load at a predetermined rotation speed Ne0 (idle operation). For example, a value of about 1000 rpm to 1100 rpm is used as the predetermined rotation speed Ne0. When the motor ECU 40 receives the torque commands Tm1*, Tm2* of the motors MG1, MG2, the motor ECU 40 executes drive control over the motor MG1 (switching control over the switching elements of the inverter 41) such that the motor MG1 is driven in accordance with the torque command Tm1* and also executes drive control over the motor MG2 (switching control over the switching elements of the inverter 42) such that the motor MG2 is driven in accordance with the torque command Tm2*.

When the required power Pe* of the engine 22 is a positive value in step S120, the HVECU 70 determines that the load operation of the engine 22 is required and compares the vehicle speed V with a threshold Vref2 lower than the threshold Vref1 (step S130). Here, the threshold Vref2 is a threshold used to determine whether to allow the load operation of the engine 22, and, for example, a value of about 2 km/h to about 4 km/h is used as the threshold Vref2. When the vehicle speed V is higher than or equal to the threshold Vref2, the HVECU 70 determines to prohibit the load operation of the engine 22 and executes a process from step S140. As will be described in detail later, when the engine 22 is operated under load and the motor MG1 is driven in a regeneration mode, forward movement torque acts on the drive shaft 36 via the planetary gear 30 due to the operations. Therefore, to stabilize the behavior at the time when the vehicle slows down, the load operation of the engine 22 is prohibited when the vehicle speed V is higher than or equal to the threshold Vref2.

Figure 4:
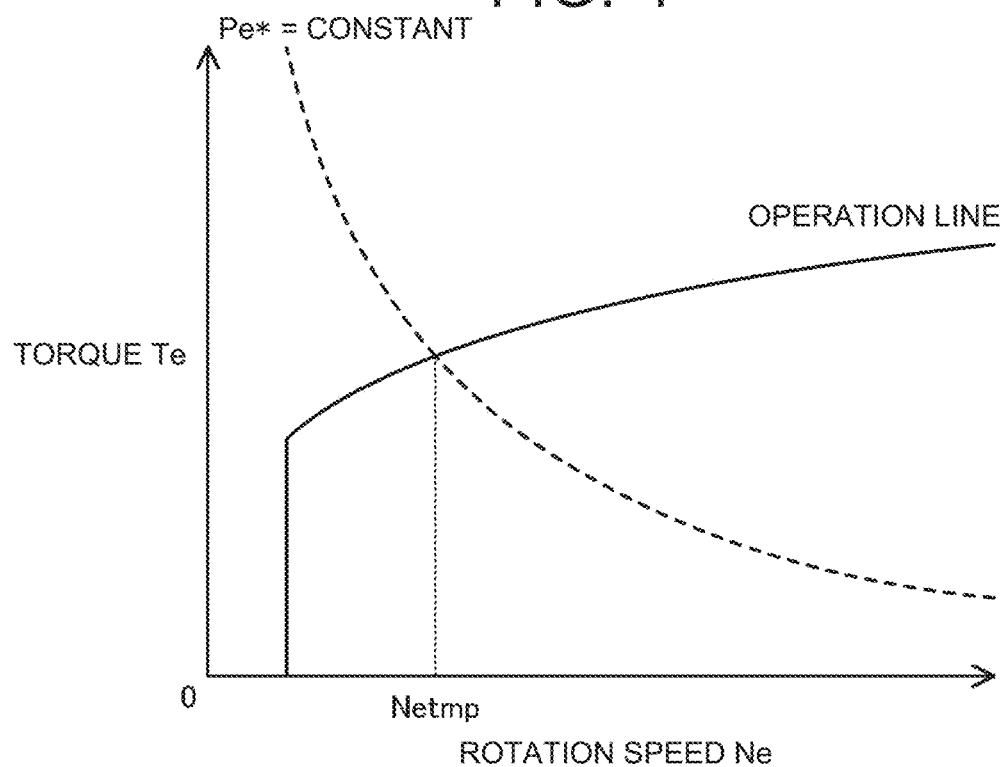
FIG. 4 is a graph illustrating an example of an operation line of an engine and a manner of setting of a temporary rotation speed.

When the vehicle speed V is lower than the threshold Vref2 in step S140, the HVECU 70 determines to allow the load operation of the engine 22 and sets a controlling lower limit rotation speed Nemin of the engine 22 through a controlling lower limit rotation speed setting process (described later) (step S170). Subsequently, the HVECU 70 sets a temporary rotation speed Netmp as a temporary value of the target rotation speed Ne* of the engine 22 based on the required power Pe* of the engine 22 and an operation line for efficiently operating the engine 22 (step S180). FIG. 4 is a graph illustrating an example of the operation line of the engine 22 and a manner of setting of the temporary rotation speed Netmp. The process of step S170 is executed by setting the rotation speed at an intersection of a curve along which the required power Pe* of the engine 22 is constant and the operation line of the engine 22 for the temporary rotation speed Netmp.

The HVECU 70 sets the target rotation speed Ne* of the engine 22 by limiting the temporary rotation speed Netmp of the engine 22 with the controlling lower limit rotation speed Nemin as a lower limit (step S190) and sets a value obtained by dividing the required power Pe* of the engine 22 by the target rotation speed Ne* for the target torque Te* of the engine 22 (step S200).

When the HVECU 70 sets the target rotation speed Ne* and target torque Te* of the engine 22 in this way, the HVECU 70 computes the torque command Tm1* of the motor MG1 through the expression (2) by using the rotation speed Ne of the engine 22, the target rotation speed Ne*, the target torque Te*, and the gear ratio ρ of the planetary gear 30 (step S210). Subsequently, the HVECU 70 computes the torque command Tm2* of the motor MG2 through the expression (3) by using the required torque Td*, the torque command Tm1* of the motor MG1, the gear ratio ρ of the planetary gear 30, and the gear ratio Gr of the reduction gear 35 (step S220).

$$Tm1^* = -Te^*/(1+\rho) + kp \cdot (Ne^* - Ne) + ki \cdot \int(Ne^* - Ne)dt \quad (2)$$

$$Tm2^* = (Td^* + Tm1^*/\rho)/Gr \quad (3)$$

Figure 5:
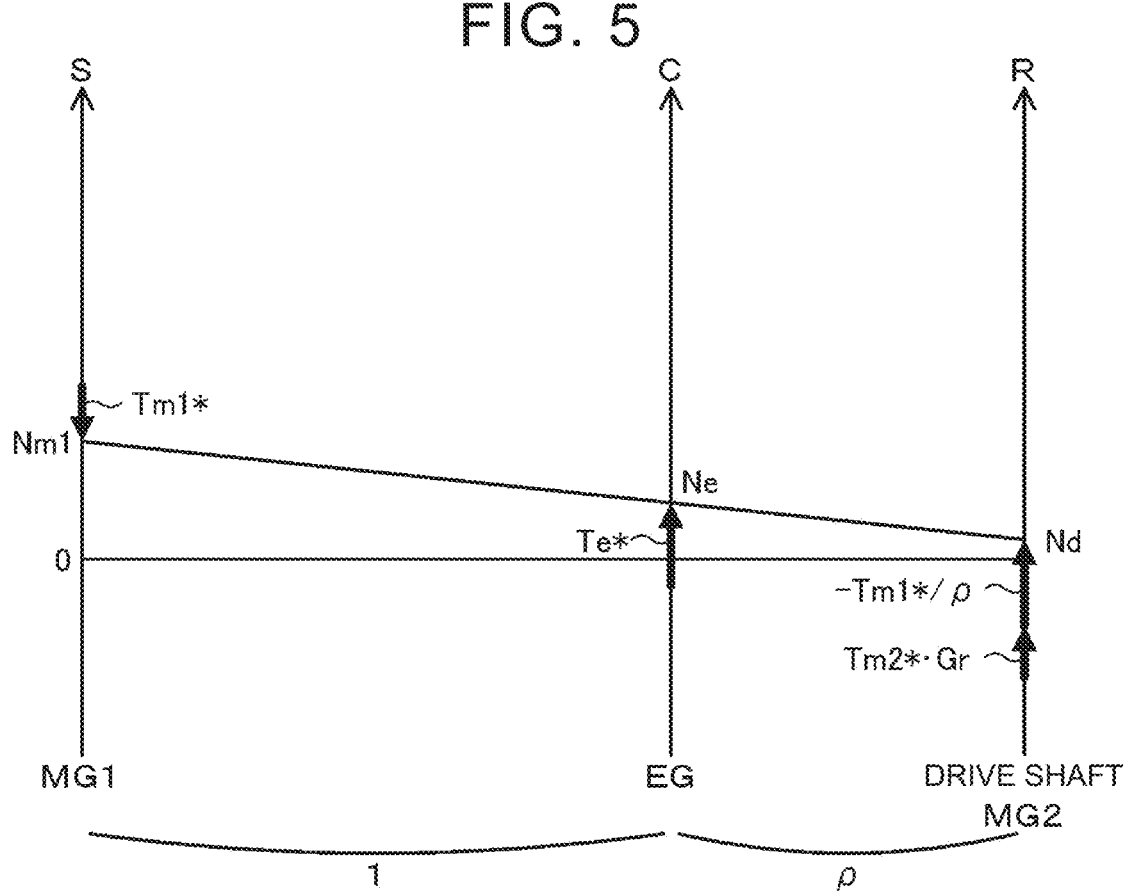
FIG. 5 is a nomograph showing an example of the relationship between a rotation speed and torque of each of rotating elements of a planetary gear.

FIG. 5 is a nomograph showing an example of the relationship between a rotation speed and torque of each of the rotating elements of the planetary gear 30. In the nomograph, the S-axis represents the rotation speed of the sun gear 31 (the rotation speed Nm1 of the motor MG1), the C-axis represents the rotation speed of the carrier 34 (the rotation speed Ne of the engine 22), the R-axis represents the rotation speed of the ring gear 32 (the rotation speed Nd of the drive shaft 36 and a rotation speed obtained by dividing the rotation speed Nm2 of the motor MG2 by the gear ratio Gr of the reduction gear 35). In the nomograph, the two wide arrows on the R-axis respectively represent a torque (−Tm1*/ρ) output to the drive shaft 36 via the planetary gear 30 resulting from the load operation of the engine 22 and the drive of the motor MG1 in the regeneration mode and a torque (Tm2*·Gr) output to the drive shaft 36 from the motor MG2 via the reduction gear 35 when the motor MG2 is driven at the torque command Tm2*.

The expression (2) is a relational expression in feedback control for rotating the engine 22 at the target rotation speed Ne*, the first term on the right-hand side is a feedforward term, and the second term and the third term on the right-hand side are respectively a proportional term and an integral term in a feedback term. In the expression (2), the first term on the right-hand side is easily derived from the nomograph of FIG. 5. In the expression (2), "kp" in the second term on the right-hand side is a gain of the proportional term, and "ki" in the third term on the right-hand side is a gain of the integral term. The expression (3), as well as the expression (1), is an expression for setting the torque command Tm2* of the motor MG2 such that the required torque Td* is output to the drive shaft 36 and is easily derived from the nomograph of FIG. 5.

The HVECU 70 sends the target rotation speed Ne* and target torque Te* of the engine 22 to the engine ECU 24, and sends the torque commands Tm1*, Tm2* of the motors MG1, MG2 to the motor ECU 40 (step S230) and ends the routine. When the engine ECU 24 receives the target rotation speed Ne* and target torque Te* of the engine 22, the engine ECU 24 executes operation control over the engine 22 such that the engine 22 is operated under load based on the target rotation speed Ne* and the target torque Te*. Drive control over the motors MG1, MG2 by the motor ECU 40 has been described above.

Figure 6:
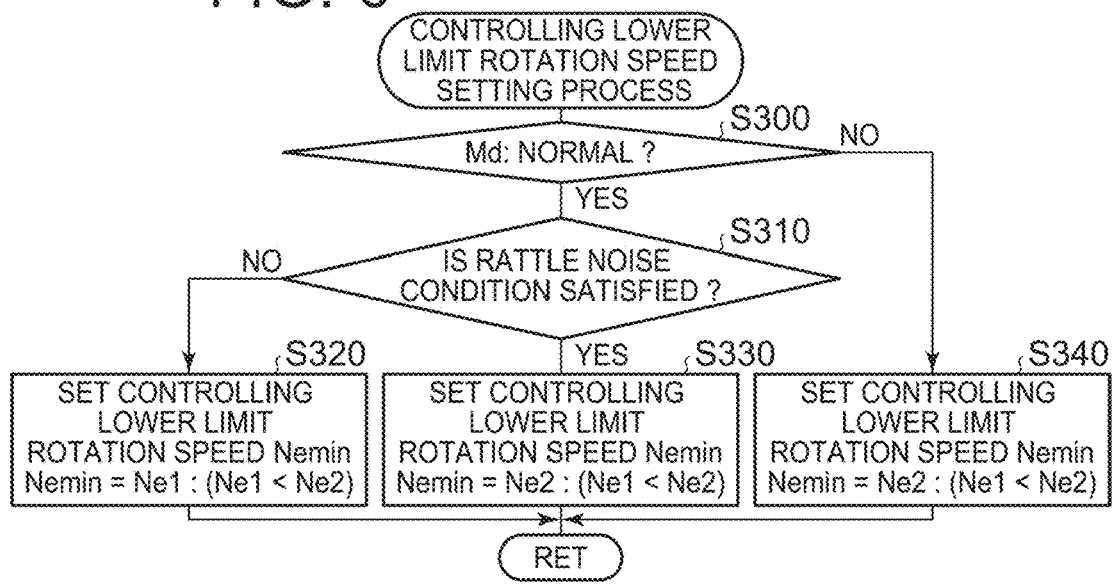
FIG. 6 is a flowchart showing an example of a controlling lower limit rotation speed setting process.

Next, the process of step S170 of the control routine of FIG. 2, that is, the process of setting the controlling lower limit rotation speed Nemin of the engine 22, will be described by using the controlling lower limit rotation speed setting process of FIG. 6. In the controlling lower limit rotation speed setting process, the HVECU 70 initially checks whether the driving mode Md is the normal driving mode or the autonomous driving mode (step S300).

When the driving mode Md is the normal driving mode in step S300, the HVECU 70 determines whether the rattle noise condition is satisfied (step S310). When the HVECU 70 determines that the rattle noise condition is not satisfied, the HVECU 70 sets the controlling lower limit rotation speed Nemin of the engine 22 to a predetermined rotation speed Ne1 (step S320) and ends the controlling lower limit rotation speed setting process.

Here, the predetermined rotation speed Ne1 is set as a lower limit of the rotation speed range in which a muffled sound of the engine 22 can be suppressed, and, for example, a value of about 1200 rpm to about 1300 rpm is used as the predetermined rotation speed Ne1. Hereinafter, control to set the controlling lower limit rotation speed Nemin of the engine 22 to the predetermined rotation speed Ne1, to set the target rotation speed Ne* and target torque Te* of the engine 22 and the torque commands Tm1*, Tm2* of the motors MG1, MG2 through the processes of step S190, step S200, step S210, and step S220 in FIG. 2, and to control the engine 22 and the motors MG1, MG2 is referred to as first control.

The rattle noise condition is a condition in which, when the first control is executed, a rattle noise is likely to successively occur at a certain frequency in the reduction gear 35 or the like connected to the motor MG2 when the actual torque of the motor MG2 is around a value of zero. The process of step S310 can be, for example, executed by applying the required torque Td* and the required power Pe* to a rattle noise relationship. The rattle noise relationship is determined in advance as a relationship among required torque Td*, required power Pe*, and whether the rattle noise condition is satisfied and is stored in the ROM or the flash memory of the HVECU 70. The rattle noise relationship is set in light of the fact that the torque command Tm2* of the motor MG2 is set based on the required torque Td*, the required power Pe*, and the controlling lower limit rotation speed Nemin (see step S180, step S190, step S200, step S210, and step S220 in FIG. 2).

When the HVECU 70 determines in step S310 that the rattle noise condition is satisfied, the HVECU 70 sets the controlling lower limit rotation speed Nemin of the engine 22 to a predetermined rotation speed Ne2 higher than the predetermined rotation speed Net (step S330) and ends the controlling lower limit rotation speed setting process. Here, the predetermined rotation speed Ne2 is set as a lower limit of the rotation speed range in which occurrence of a rattle noise in the reduction gear 35 or the like at a certain frequency can be suppressed, and, for example, a value of about 1400 rpm to about 1500 rpm is used as the predetermined rotation speed Ne2. Hereinafter, control to set the controlling lower limit rotation speed Nemin of the engine 22 to the predetermined rotation speed Ne2, to set the target rotation speed Ne* and target torque Te* of the engine 22 and the torque commands Tm1*, Tm2* of the motors MG1, MG2 through the processes of step S190, step S200, step S210, and step S220 in FIG. 2, and to control the engine 22 and the motors MG1, MG2 is referred to as second control. In the second control, as compared to the first control, the target rotation speed Ne* of the engine 22 increases and the target torque Te* reduces, so the torque command Tm1* of the motor MG1 increases, that is, approaches to a value of zero (see the expression (2)), and the torque command Tm2* of the motor MG2 increases when the required torque Td* is a positive value (creep torque) (see the expression (3)). Thus, the actual torque of the motor MG2 continuously around a value of zero is suppressed, and occurrence of a rattle noise in the reduction gear 35 or the like at a certain frequency is suppressed.

When the driving mode Md is the autonomous driving mode in step S300, the HVECU 70 sets the controlling lower limit rotation speed Nemin of the engine 22 to the predetermined rotation speed Ne2 without determining whether the rattle noise condition is satisfied (step S340) and ends the controlling lower limit rotation speed setting process. In this case, the HVECU 70 executes the second control regardless of whether the rattle noise condition is satisfied. Thus, when the engine 22 is being operated under load at the time when the vehicle slows down and stops in the autonomous driving mode, switching of the controlling lower limit rotation speed Nemin of the engine 22 is suppressed, so a sudden change in the rotation speed Ne of the engine 22 is suppressed. As a result, an uncomfortable feeling of the driver is reduced.

Figure 7:
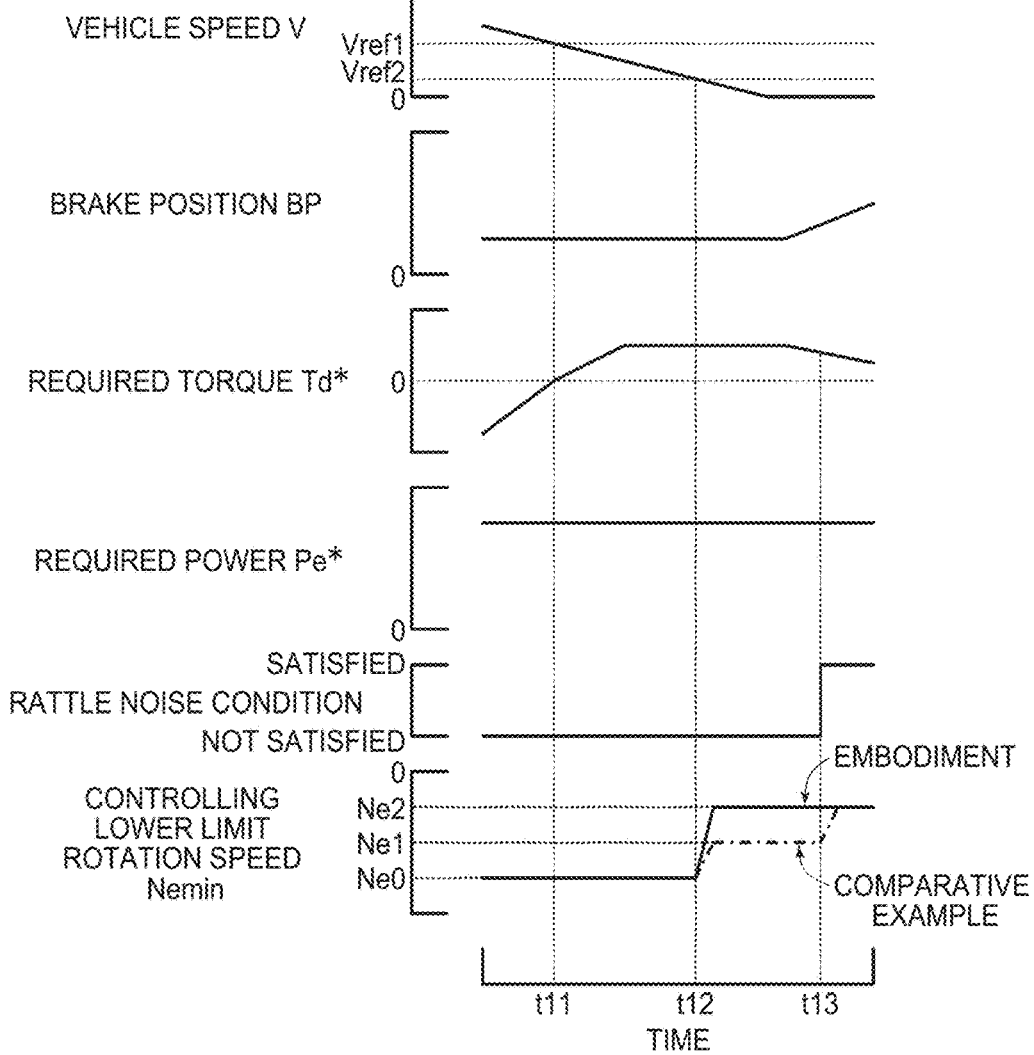
FIG. 7 is a timing chart showing an example of changes in vehicle speed, brake position, required torque, required power, and controlling lower limit rotation speed of the engine at the time when the vehicle slows down and stops in an autonomous driving mode.

FIG. 7 is a timing chart showing an example of changes in vehicle speed V, brake position BP, required torque Td*, required power Pe*, and controlling lower limit rotation speed Nemin of the engine 22 at the time when the vehicle slows down and stops in the autonomous driving mode. In the timing chart, for the target rotation speed Ne* of the engine 22, the continuous line represents changes according to the embodiment, and the alternate long and short dashed line represents changes in a comparative example. In the comparative example, in the autonomous driving mode, as in the case in the normal driving mode, the controlling lower limit rotation speed Nemin of the engine 22 is set to the predetermined rotation speed Ne1 or the predetermined rotation speed Ne2 based on whether the rattle noise condition is satisfied. As described above, the required torque Td* is set based on a vehicle speed V and a brake position BP, and whether the rattle noise condition is satisfied is set based on a required torque Td* and a required power Pe*.

As shown in the timing chart, in the embodiment and the comparative example, when the vehicle speed V decreases and becomes lower than the threshold Vref1 (time t11), the required torque Td* becomes a positive value, and output of creep torque is started, and, when the vehicle speed V becomes lower than the threshold Vref2 (time t12), the load operation of the engine 22 is started. In the comparative example, when the engine 22 is operated under load (from time t12), when the rattle noise condition is not satisfied (time t12 to time t13), the controlling lower limit rotation speed Nemin of the engine 22 is set to the predetermined rotation speed Ne1; whereas, when the rattle noise condition is satisfied (from time t13), the controlling lower limit rotation speed Nemin of the engine 22 is set to the predetermined rotation speed Ne2. Therefore, when the engine 22 is being operated under load at the time when the vehicle slows down and stops in the autonomous driving mode, the controlling lower limit rotation speed Nemin of the engine 22 may switch, and the rotation speed Ne of the engine 22 may suddenly change, with the result that the driver may feel uncomfortable. In contrast, in the embodiment, when the engine 22 is operated under load (from time t12), the controlling lower limit rotation speed Nemin of the engine 22 is set to the predetermined rotation speed Ne2 regardless of whether the rattle noise condition is satisfied. Thus, when the engine 22 is being operated under load at the time when the vehicle slows down and stops in the autonomous driving mode, switching of the controlling lower limit rotation speed Nemin of the engine 22 is suppressed, so a sudden change in the rotation speed Ne of the engine 22 is suppressed. As a result, an uncomfortable feeling of the driver is reduced.

With the hybrid vehicle 20 of the above-described embodiment, when the engine 22 is operated under load at the time when the vehicle slows down and stops in the autonomous driving mode, the target rotation speed Ne* of the engine 22 is set to the predetermined rotation speed Ne2 (a higher one of the predetermined rotation speeds Ne1, Ne2) regardless of whether the rattle noise condition is satisfied, and the engine 22 is controlled such that the engine 22 is operated under load within the range higher than or equal to the controlling lower limit rotation speed Nemin. Thus, when the engine 22 is being operated under load at the time when the vehicle slows down and stops in the autonomous driving mode, switching of the controlling lower limit rotation speed Nemin of the engine 22 is suppressed, so a sudden change in the rotation speed Ne of the engine 22 is suppressed. As a result, an uncomfortable feeling of the driver is reduced.

With the hybrid vehicle 20 of the embodiment, a lower limit of the rotation speed range in which a muffled sound of the engine 22 can be suppressed is used as the predetermined rotation speed Ne1, and a lower limit of the rotation speed range in which occurrence of a rattle noise in the reduction gear 35 or the like can be suppressed at a certain frequency is used as the predetermined rotation speed Ne2. However, the predetermined rotation speeds Ne1, Ne2 are not limited thereto. For example, a lower limit or the like of the rotation speed range in which an exhaust noise of the engine 22 can be suppressed may be used as any one of the predetermined rotation speeds Ne1, Ne2.

With the hybrid vehicle 20 of the embodiment, when the engine 22 is operated under load at the time when the vehicle slows down and stops in the normal driving mode, the controlling lower limit rotation speed Nemin of the engine 22 is set to the predetermined rotation speed Ne1 or the predetermined rotation speed Ne2; whereas, when the engine 22 is operated under load at the time when the vehicle slows down and stops in the autonomous driving mode, the target rotation speed Ne* of the engine 22 is set to the predetermined rotation speed Ne2 (a higher one of the predetermined rotation speeds Ne1, Ne2). However, when the engine 22 is operated under load at the time when the vehicle slows down and stops in the normal driving mode, the controlling lower limit rotation speed Nemin of the engine 22 may be set to a rotation speed selected from among three or more candidate rotation speeds; whereas, when the engine 22 is operated under load at the time when the vehicle slows down and stops in the autonomous driving mode, the controlling lower limit rotation speed Nemin of the engine 22 may be set to a maximum rotation speed of the three or more candidate rotation speeds.

With the hybrid vehicle 20 of the embodiment, the motor MG2 is connected via the reduction gear 35 to the drive shaft 36 coupled to the drive wheels 39. However, the motor MG2 may be connected to the drive shaft 36 via a transmission. Alternatively, the motor MG2 may be connected to the drive shaft 36 via a mechanical coupling portion other than the reduction gear 35 or the transmission, for example, mutually meshing two gears or the like.

With the hybrid vehicle 20 of the embodiment, the battery 50 is used as the electrical storage device. Alternatively, a capacitor may be used as the electrical storage device instead of or in addition to the battery 50.

The hybrid vehicle 20 of the embodiment includes the engine ECU 24, the motor ECU 40, the battery ECU 52, and the HVECU 70. Alternatively, at least two of these ECUs may be configured as a single electronic control unit.

The correspondence relation between major elements of the embodiment and major elements of the aspect of the disclosure described in Summary will be described. In the embodiment, the engine 22 may be regarded as the engine, the motor MG2 may be regarded as the motor, the battery 50 may be regarded as the electrical storage device, and the HVECU 70, the engine ECU 24, and the motor ECU 40 may be regarded as the controller.

The correspondence relation between major elements of the embodiment and major elements of the aspect of the disclosure described in Summary does not limit the elements of the disclosure described in the Summary since the embodiment is an example for specifically describing the aspect of the disclosure described in the Summary. In other words, the aspects of the disclosure described in the Summary should be interpreted based on the description therein, and the embodiment is only a specific example of the aspect of the disclosure described in the Summary.

The embodiment of the disclosure is described above. However, the disclosure is not limited to the embodiment and may be, of course, modified into various forms without departing from the scope of the disclosure.

The disclosure is usable in the industry of manufacturing hybrid vehicles.

What is claimed is:

1. A hybrid vehicle comprising:
an engine;
a motor; and
a controller configured to control the engine and the motor, wherein the controller is configured to, when the engine is operated under load at the time when the vehicle slows down and stops in an autonomous driving mode in which the vehicle runs without driver's operation, set a controlling lower limit rotation speed of the engine to a maximum rotation speed out of a plurality of candidate rotation speeds and control the engine such that the engine is operated under load within a range higher than or equal to the controlling lower limit rotation speed.

2. The hybrid vehicle according to claim 1, wherein:
the motor is coupled to a drive wheel via a mechanical coupling portion; and
the plurality of candidate rotation speeds includes a first rotation speed used to reduce a muffled sound of the engine and a second rotation speed higher than the first rotation speed and used to reduce a rattle noise at the mechanical coupling portion.

3. The hybrid vehicle according to claim 1, wherein the controller is configured to, when the engine is operated under load at the time when the vehicle slows down and stops in a normal driving mode in which the vehicle runs with driver's operation, set the controlling lower limit rotation speed to a rotation speed selected from among the plurality of candidate rotation speeds based on a brake operation amount and control the engine such that the engine is operated under load within a range higher than or equal to the controlling lower limit rotation speed.

4. The hybrid vehicle according to claim 3, further comprising:
a second motor; and
a planetary gear including three rotating elements respectively connected to the second motor, the engine, and a drive shaft coupled to a drive wheel so as to be arranged in a stated order in a nomograph, wherein:
the motor is coupled to the drive wheel via a mechanical coupling portion;
the plurality of candidate rotation speeds includes a first rotation speed used to reduce a muffled sound of the engine and a second rotation speed higher than the first rotation speed and used to reduce a rattle noise at the mechanical coupling portion; and
the controller is configured to
when the engine is operated under load at the time when the vehicle slows down and stops in the normal driving mode, and when the controller determines that a rattle noise condition related to a rattle noise at the mechanical coupling portion is not satisfied based on the brake operation amount, set the controlling lower limit rotation speed to the first rotation speed, and, when the controller determines that the rattle noise condition is satisfied, set the controlling lower limit rotation speed to the second rotation speed; and
when the engine is operated under load at the time when the vehicle slows down and stops in the autonomous driving mode, set the controlling lower limit rotation speed to the second rotation speed.

* * * * *